(12) United States Patent
Jo

(10) Patent No.: US 8,311,803 B2
(45) Date of Patent: Nov. 13, 2012

(54) METHOD AND DEVICE FOR PROVIDING DISPLAY OF E-MANUAL IN A SPECIFIC LANGUAGE IN DISPLAY DEVICE

(75) Inventor: Jae Woo Jo, Gumi (KR)

(73) Assignee: LG Electronics Inc., Seoul (KR)

( * ) Notice: Subject to any disclaimer, the term of this patent is extended or adjusted under 35 U.S.C. 154(b) by 922 days.

(21) Appl. No.: 12/347,189

(22) Filed: Dec. 31, 2008

(65) Prior Publication Data

US 2009/0299728 A1    Dec. 3, 2009

(30) Foreign Application Priority Data

Jun. 3, 2008    (KR) ........................ 10-2008-0052106

(51) Int. Cl.
*G06F 17/20* (2006.01)
*G06F 17/28* (2006.01)

(52) U.S. Cl. ..................... 704/8; 704/2; 704/1
(58) Field of Classification Search .................. None
See application file for complete search history.

(56) References Cited

U.S. PATENT DOCUMENTS

| | | | | |
|---|---|---|---|---|
| 4,731,735 | A * | 3/1988 | Borgendale et al. | 1/1 |
| 5,416,903 | A * | 5/1995 | Malcolm | 715/703 |
| 5,870,084 | A * | 2/1999 | Kanungo et al. | 345/551 |
| 6,775,678 | B1 * | 8/2004 | Hillberg et al. | 1/1 |
| 6,883,139 | B2 * | 4/2005 | Takeoka | 715/230 |
| 7,039,867 | B1 * | 5/2006 | Scheidig | 715/703 |
| 7,046,984 | B2 * | 5/2006 | Liu et al. | 455/403 |
| 2001/0044809 | A1 | 11/2001 | Parasnis et al. | |
| 2002/0083153 | A1 * | 6/2002 | Sweatt et al. | 709/218 |
| 2003/0090453 | A1 | 5/2003 | Fischer | |
| 2004/0015343 | A1 * | 1/2004 | Nakayama | 704/8 |
| 2005/0094986 | A1 | 5/2005 | Miyazaki et al. | |

FOREIGN PATENT DOCUMENTS

| | | |
|---|---|---|
| AU | 2005232249 A1 * | 7/2006 |
| CN | 1208531 | 2/1999 |
| CN | 1893577 | 1/2007 |
| CN | 101035221 | 9/2007 |
| CN | 101072312 | 11/2007 |
| CN | 101600078 | 12/2009 |
| WO | WO 97/18673 | 5/1997 |
| WO | WO2008050279 | 5/2008 |

OTHER PUBLICATIONS

Chinese Office Action dated Aug. 4, 2010 for Application No. 200810186594.4.
European Search Report dated Nov. 16, 2010.
Chinese Office Action date Aug. 4, 2010 for 200810186594.4.

* cited by examiner

*Primary Examiner* — Jesse Pullias
(74) *Attorney, Agent, or Firm* — Ked & Associates LLP

(57) ABSTRACT

A method for controlling a display device includes setting an operational language of the display device, receiving a request to display a manual, reading an image, and reading language data to be displayed with the image. The language data may correspond to the operational language set for the display device. The image and language data are combined for display at predetermined locations within a page of the manual. The image and language data may be stored separately and the manual may be a type which guides a user in controlling an operation of the display device.

16 Claims, 4 Drawing Sheets

Fig. 8

OPERATIONAL LANGUAGE SETTING

☑ English
☐ French
☐ German
☐ Russian
☐ Italia (a)

E-MANUAL LANGUAGE SETTING

☐ English
☑ French
☐ German
☐ Russian
☐ Italia (b)

METHOD AND DEVICE FOR PROVIDING DISPLAY OF E-MANUAL IN A SPECIFIC LANGUAGE IN DISPLAY DEVICE

BACKGROUND

1. Field

One or more embodiments described herein relate to controlling the display of information.

2. Background

Consumers of electronic products are often given user manuals in paper form or incorporated within image files on a disk. Paper manuals take up space, can be lost, are inconvenient to use, and costly for the manufacturer to produce. Image files require significant amounts of storage capacity, are time-consuming to generate, and also are costly to produce.

BRIEF DESCRIPTION OF THE DRAWINGS

FIG. 8 is a diagram showing a screen that may be displayed on a display device according to one or more embodiments described herein.

DETAILED DESCRIPTION

Figure 1:
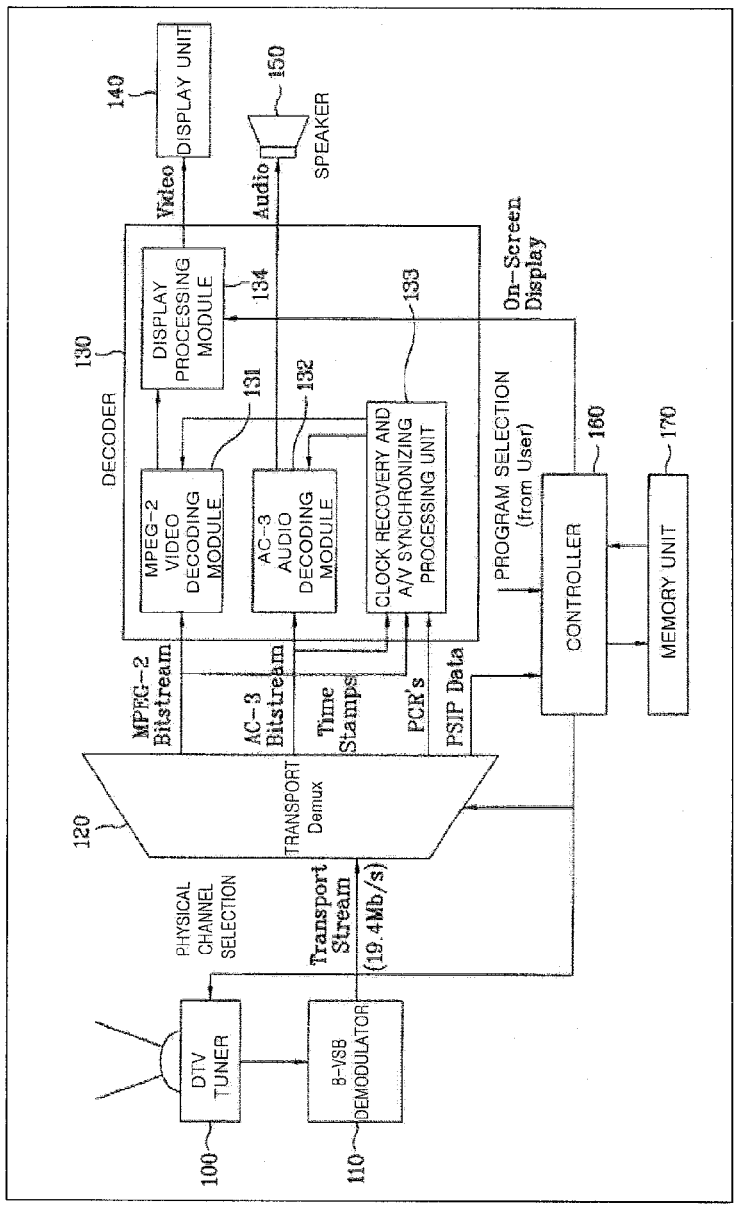
FIG. 1 is a diagram showing one embodiment of a display device.

FIG. 1 shows one embodiment of a display device which includes a tuner 100 for receiving video signals in a transport stream corresponding to a channel selected by a user, a demodulator 110 for demodulating the transport streams received from the tuner, a transport demultiplexer 120 for demultiplexing the demodulated transport streams into video bit-streams, audio bit-streams, and PSIP data, and a decoder 130 for outputting video and audio signals by decoding the signals demultiplexed by the transport demultiplexer. The video signals may be analog or digital in form and may be derived from a broadcast, satellite, cable or other source. The tuner may be a television tuner.

The display device further includes a display unit 140, a speaker 150, a controller 160, and a memory unit 170. The display unit displays the video signals and a manual for the display device at the request of the user. The speaker outputs the audio signals. The controller outputs a channel/program selection signal to the tuner and demodulator 110 in accordance with the PSIP data from transport demultiplexer 120, provides an OSD function, and outputs a video signal storage command set by the user. The memory unit stores the video signals received through the tuner in accordance with a video signal storage command and further stores at least one image to be displayed on the manual and a language text in accordance with the kind of the language.

The memory unit may include display location information of the language data and at least one image that will be displayed on the manual. The memory unit may therefore store the at least one image to be displayed on the manual, the language text in accordance with one or more languages, and the display location information for the image and the language text.

In one embodiment, the memory unit may be divided into sections or into first, second, and third memories so that images, text, and location information can assigned to (and stored separately and/or independently in) the respective sections or the respective first, second, and third memories. For example, image data may be stored in the first memory or section, language data of at least one language may be stored in the second memory or section, and display location information for controlling display of the image data relative to language data may be stored in the third memory or section.

Alternatively, image data and display location information of the image data may be stored in the first memory and language data and display location information of the language data may be stored in the second memory. Alternatively, image data may be stored in the first memory, text data may be stored in the second memory, and display location information of the image and text data may be stored in the first or second memories.

Therefore, memory unit 170 stores at least one image to be displayed on the manual, language text in accordance with at least one kind of the language, and display location information for the image and language text. The location information for the image and language data may be expressed, for example, by an extensible markup language (XML). Link information may be provided for determining which images are to be combined for display with specific language data in each page of the manual. The link information may be incorporated, for example, as encoded XML language. If desired, the language data (e.g., text) and location information for the text and/or images may be encoded using XML.

When stored in separate files, the language data may be stored in files such as English.xml, German.xml, etc., and the images may be stored in files organized, for example, based on the page of the manual where the image is to be included, e.g., page1.jpg. Also, the memory area(s) used to store the language data may store redundant copies of this data, each copy in a different kind of language. Using the encoded XML link information, pages of the manual may be generated in a language selected by the user.

The controller 160 performs general control operations of the display device. The operational language of the display device may be set in the controller by the user. When manual display request signals are generated by the user, the controller reads and processes image and language text in accordance with the kind of the language data to generate a page of the manual for display.

Figure 2:
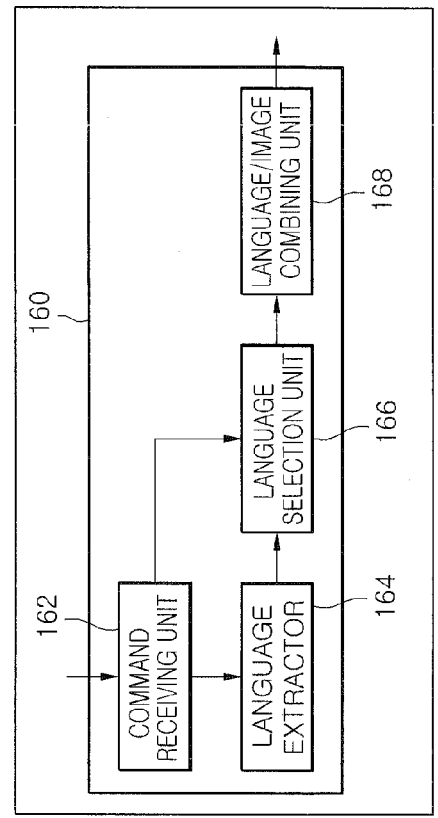
FIG. 2 is a diagram of a control unit that may be used with the device of FIG. 1.

More specifically, in accordance with the embodiment shown in FIG. 2, the controller may includes a command receiver 162, a language extractor 164, a language selection unit 166, and a language/image combining unit 168.

The command receiver receives manual display request signals input, for example, through a key input unit by the user.

The language extractor 164 extracts a preset language or language data in accordance with a specified kind of language selected by the user in accordance with the received command from the command receiver.

The language selection unit selects, or sets, the operational language or manual language in accordance with the extracted language or the kind of the language data selected by the user. The combining unit combines the language data and the image for the manual display.

The decoder 130 includes a video decoding module 131 for decoding the video bit stream into a video signal, an audio decoding module 132 for decoding the audio bit stream into an audio signal, a clock recovery/A/V synchronizing signal processor 133 for processing clock recovery and A/V synchronizing signals of the video and audio decoding modules, and a display processing module 134 for converting the vide signal decoded by the video decoding module into an image output format that can be displayed. The display processing module 134 functions as a scaler for scaling an image into a variety of aspect ratio such as a 4:3 screen, a 16:9 screen (zoom), a wide screen, or a spectacle screen.

Figure 3:
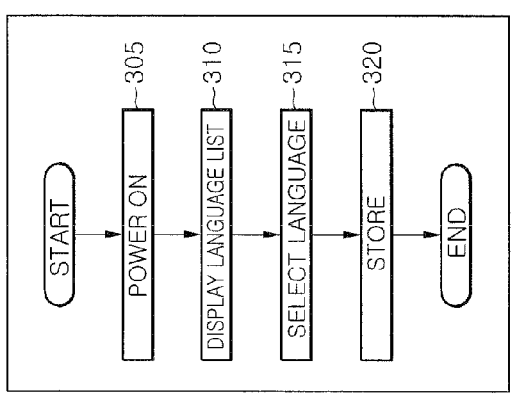
FIG. 3 is a diagram showing steps included in one embodiment of a method for setting an operational language of a display device.

FIG. 3 shows one embodiment of a method for setting an operational language of a display device. When an initial power application is requested by the user (Operation 305), controller 160 turns on the power of the display device and requests display of a language list, for example, as shown in FIG. 7A so that the user can select a language for operating the display device and for displaying text that will appear in the manual (Operation 310). The controller receives a signal selecting one of the languages in the list and stores a setting corresponding to the selected language (Operation 320). For example, as shown in FIG. 7A, when the language is "English" selected from among a plurality of languages in the list, the controller sets the text that will be displayed for the manual in the language "English."

In one embodiment, the operational language may be set by the user in an initial operation of the display device. In other embodiments, the operational language may be preset during a manufacturing process before the display device is on the market. In this case, the operational language setting process may be omitted.

Figure 4:
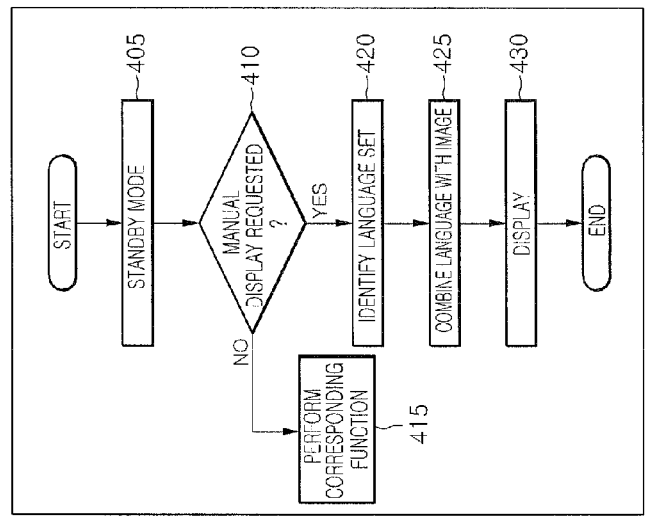
FIG. 4 is a diagram showing steps included in one embodiment of a method for displaying an e-manual on a display device.

FIG. 4 shows one embodiment of a method for displaying an e-manual in an operational language set as described with reference to FIG. 3. When a specific operation request signal by the user is detected during standby mode or another operation mode (Operation 405), controller 160 determines if the operation request signal is an e-manual display request signal (Operation 410). The operation request signal may be generated, for example, by local keys provided on a remote control (not shown) or a display device. Additionally, or alternatively, an e-manual request signal may be generated based on a selection in a predetermined menu displayed for requesting the e-manual.

When it is determined, in Operation 410, that the specific operation request signal is an e-manual display request signal, the controller performs control steps to allow generation of the manual to be performed. For example, when it is determined that the operation request signal is an e-manual display request signal, the controller identifies the kind of the language data set in the display device (Operation 420). As described above, the kind of the language data set in the display device may be the operational language set by the user as described with reference to FIG. 3 or the operation language set during the manufacturing process of the display device. When it is determined, in Operation 410, that the specific operation request signal is not an e-manual display request signal, the controller performs a function corresponding to the signal (Operation 415).

Figure 5:
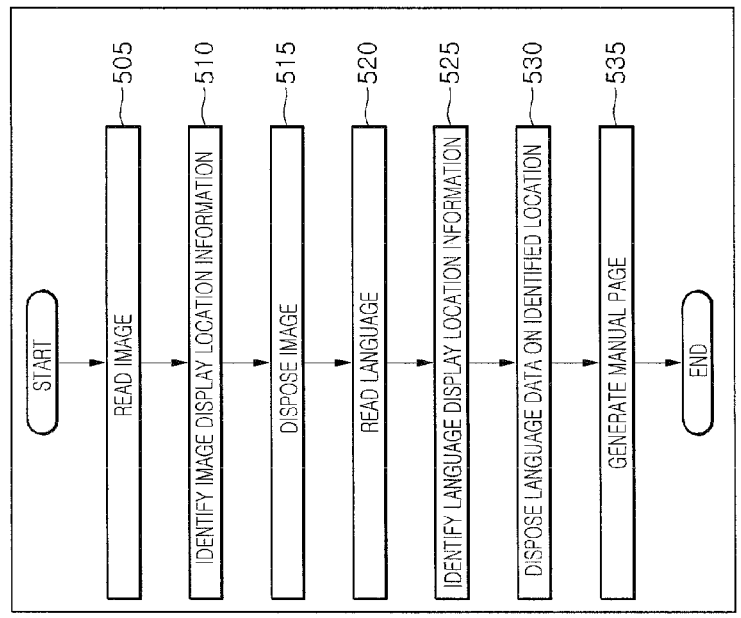
FIG. 5 is a diagram showing steps included in one embodiment of a method for generating an e-manual.

The controller 160 combines one or more images with text corresponding to the kind of the language identified and set in the display device (Operation 425). When e-manual display is requested by the user, the controller identifies the kind of the language data preset in the display device and combines language data and one or more corresponding or preset images to be displayed with the language data in the e-manual (Operation 430). This combining process will be described in detail with reference to FIG. 5.

When an e-manual display is requested by the user, the controller reads an image to be displayed on the e-manual as preset in the memory unit 170 (Operation 505). This may correspond to a first or another predetermined page of the manual. The controller 160 then identifies the display location of the read image on the e-manual (Operation 510).

The controller 160 sets the image on the e-manual in accordance with the identified display location and subsequently reads the language data (e.g., text) from the memory unit. The language data will be displayed on the e-manual in accordance with the kind of language preset or set by the user (Operation 520).

Figure 7:
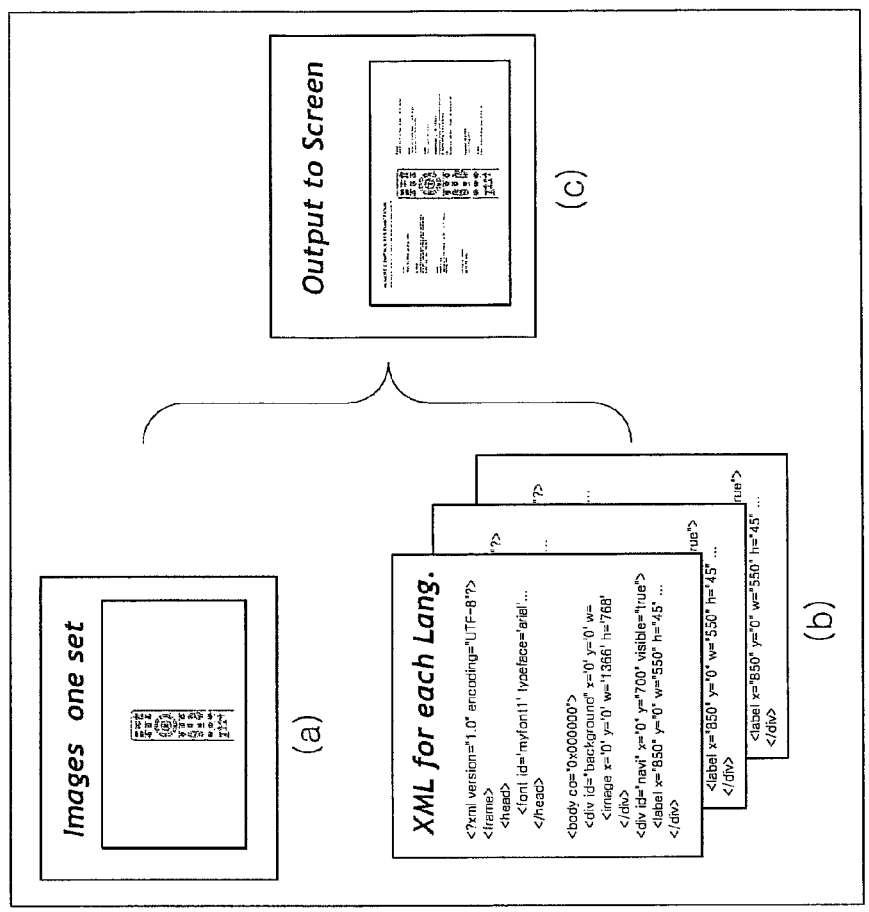
FIG. 7 is a diagram showing one way in which an e-manual may be generated in accordance with one or more of the embodiments described herein.

Through a process similar to the process for displaying the image, the controller identifies the display location of the read language data (Operation 525) and sets the language data at the identified location (Operation 530). The controller then generates for display an e-manual page containing the image and language data at their respective locations (Operation 535). The language data and image are combined at these locations within the e-manual page based on XML code. Referring to FIG. 7, as an example the image is shown at position (a), the XML code for each language is shown at position (b), and the combined result corresponding to the e-manual page is shown at position (c).

Figure 6:
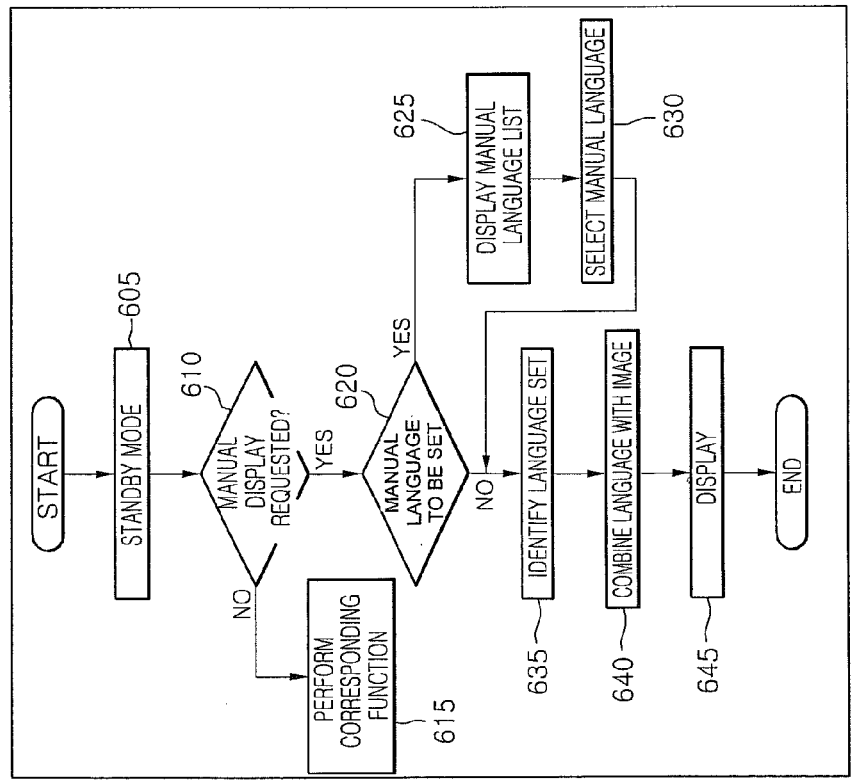
FIG. 6 is a diagram showing steps included in another embodiment of a method for displaying an e-manual on a display device.

FIG. 6 shows steps included in an embodiment of a method for displaying at least one page of an e-manual on a display device. Initially, the display device is operating in a specific mode or standby mode (Operation 605). Controller 160 then determines if display of an e-manual is requested by a user (Operation 610). If not, the display device continues to perform operations in its current mode (Operation 615).

When an e-manual display request signal is received from a user, the kind of language to be used in displaying language data (e.g., text) in the e-manual is determined. The kind of language may be one preset in the display device (e.g., operational language) or the user may be given the option of setting the kind of language to one different that the preset language.

That is, when a manual display request signal is input by the user, the controller determines whether the kind of language that will be used in displaying the e-manual has been set (Operation 620). If the user has input a request signal to select the kind of language that will be used in displaying the e-manual, the controller may display a language list as shown in FIG. 8 (Operation 625). When a selection is made from the list, the controller configures the display device to display the e-manual based on the kind of language selected by the user (Operation 630).

Next, the controller identifies at least one image and the language data (e.g., text) stored in memory to be used in generating a page of the e-manual for display (Operation 635). The page may be a first page of the manual, a predetermined page, or a specific page number or a page that corresponds to a specific index word or topic designated by the user.

After the image and language data have been identified, controller 160 combines the language data and image in accordance with the aforementioned combining process using, for example, coded XML information to control the relative locations of the image and language data (Operation 640). The coded XML information is stored in the display device with the image and language data. The language data includes text that appears in the kind of language previously set. A page of the e-manual is then displayed based on the combined language data and image (Operation 645).

When the user has not made a selection as to the kind of the language to be used for the language data in e-manual in Operation 610, the language data of the e-manual will be expressed using the kind of language that corresponds to the operational language set for the display device or a default language.

One or more embodiments disclosed herein therefore provide a method and system for generating and displaying a manual of a display device, which, for example, may be a user's manual that guides a user in controlling a television, monitor, or other display apparatus. Such a system and method can store a manual using minimum capacity of a memory of the display device.

In accordance with one embodiment, a method of providing a manual in a display device comprises setting an operational language, receiving a manual display request, reading an image that will be displayed on the manual, reading a language data corresponding to the language set, and displaying the manual by combining the image read with the language data read.

In accordance with another embodiment, a manual providing system of a display device comprises a setting unit for setting an operational language of a display device, a memory unit for storing at least one image and at least one language data that will be displayed on a manual, a manual display request signal receiving unit for receiving a signal for operating the display device or a manual display request signal, an extractor for extracting a language data, which corresponds to the operational language, from the memory unit, a combining unit for combining the image with the language data extracted, and a display unit for displaying the manual formed by the combination of image and language data extracted.

According to one or more of the foregoing embodiments, the user can easily view or identify the manual required for operating the display device on a screen of the display device. In addition, since the manuals formed in different language data and with different images occupy a minimum capacity of the memory unit, the utilization of the memory unit can be maximized. The details of one or more embodiments are set forth in the accompanying drawings and the description below. Other features will be apparent from the description and drawings, and from the claims.

In any of the foregoing embodiments, additional language data (either in a language corresponding to language data already stored in the system or in a new language) may be received through a network such as the Internet for storage in the one or more memories or memory sections. A manual may then be generated for display by combining the additional language data with one or more images previously stored or which have also been received through the network.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method for controlling a display device, comprising:
setting an operational language of the display device, the operational language being at least one language provided by a manufacturer of the display device;
receiving a request from a user to display a manual;
receiving a request from the user to select a first language different from the set operational language for displaying the manual;
reading one or more images from one or more files corresponding to a page of the manual in which the one or more images are to be included;
reading first language data to be displayed with the one or more images, the first language data corresponding to the selected first language;
reading display location information for the one or more images and the first language data;
reading link information for combining the one or more images for display with the first language data corresponding to the page of the manual;
combining the one or more images and first language data for simultaneous display at predetermined locations within a same screen corresponding to the page of the manual based on the link information, wherein the one or more images and the first language data are stored separately, and wherein the manual guides a user in controlling an operation of the display device;
receiving additional language data from a network; and
combining the additional language data with the one or more read images or one or more new images for simultaneous display at predetermined locations within another page of the manual.

2. The method of claim 1, wherein the one or more images are is used with second language data, the second language data being a language different from the first language data.

3. The method of claim 2, wherein the one or more images are used with the second language data after the request is received to select the first language different from the operational language of the device.

4. The method of claim 2, wherein the second language data is stored in a same file with the first language data.

5. The method of claim 2, wherein the first language data and the second language data are stored in separate files.

6. The method of claim 1, further comprising:
changing the operational language of the display device,
wherein language data corresponding to the changed operational language is read and simultaneously displayed at predetermined locations with the one or more images in the manual.

7. The method of claim 6, wherein the operational language is changed based on a selection in a menu displayed on a screen of the display device.

8. The method of claim 7, further comprising:
displaying a predetermined list of languages in the menu, wherein said selection corresponds to one of the languages in the list.

9. The method of claim 1, wherein selecting the first language for the manual different from the operational language of the display device does not change the operational language of the display device.

10. The method of claim 1, wherein the one or more images are stored in a first memory area and the first language data is stored in a second memory area separate from the first memory area.

11. The method of claim 10, wherein the second memory area stores a plurality of redundant copies of language data, each copy corresponding to a different kind of language.

12. The method of claim 1, wherein said combining the one or more images with the first language data includes:
reading first location information indicating a predetermined location of the one or more images within the page of the manual; and
reading second location information indicating a predetermined location of the first language data within the page of the manual, wherein the one or more images and first language data are combined for display within the page of the manual based on the first and second location information.

13. The method of claim 12, wherein the first and second location information is included in encoded XML language.

14. The method of claim 12, wherein the one or more images, first language data, and first and second location information are stored in separate memory areas of the display device.

15. The method of claim 1, wherein the one or more images and first language data are stored in at least one internal memory of the display device.

16. A display device comprising:
an interface to receive a first request from a user to display a manual and a second request from the user to select a first language for displaying the manual, wherein the first language is different from an operational language set for the display device;
at least one memory to store one or more images and language data for the manual; and
a controller to set the operational language of the display device, the operational language being at least one language provided by a manufacturer of the display device, and wherein the controller is also to:
read the one or more images from the at least one memory, wherein the one or more images are read from one or more files corresponding to a page of the manual in which the one or more images are to be included,
read first language data from the at least one memory, wherein the first language data is to be displayed with the one or more images and corresponds to the selected first language,
read display location information for the one or more images and the first language data,
read link information for combining the one or more images for display with the first language data corresponding to the page of the manual, and
combine the one or more images and first language data for simultaneous display at predetermined locations within a same screen corresponding to the page of the manual based on the link information, wherein the one or more images and the first language data are stored separately and wherein the manual guides a user in controlling an operation of the display device, and wherein the controller is also to:
receive additional language data from a network; and
combine the additional language data with the one or more read images or one or more new images for simultaneous display at predetermined locations within another page of the manual.

* * * * *